US010054956B1

(12) United States Patent
Anschuetz et al.

(10) Patent No.: US 10,054,956 B1
(45) Date of Patent: Aug. 21, 2018

(54) MARINE PROPULSION SYSTEM AND METHOD OF CONTROLLING THE SAME FOR MITIGATING CHINE WALK

(71) Applicant: Brunswick Corporation, Lake Forest, IL (US)

(72) Inventors: Steven M. Anschuetz, Fond du Lac, WI (US); Andrew J. Przybyl, Berlin, WI (US); Justin R. Poirier, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 89 days.

(21) Appl. No.: 15/331,004

(22) Filed: Oct. 21, 2016

(51) Int. Cl.
*B63H 25/04* (2006.01)
*G05D 1/08* (2006.01)
*B63B 39/00* (2006.01)
*B63H 25/02* (2006.01)

(52) U.S. Cl.
CPC ........... *G05D 1/0875* (2013.01); *B63B 39/00* (2013.01); *B63H 25/04* (2013.01); *B63H 2025/022* (2013.01)

(58) Field of Classification Search
CPC ......... B63B 39/00; B63B 49/00; B63H 25/04; B63H 21/213; B63H 21/22; B63H 25/42; G05D 1/0206
USPC .......................................................... 701/21
See application file for complete search history.

(56) References Cited

U.S. PATENT DOCUMENTS

| 4,846,741 | A | * | 7/1989 | Betsinger ............. B63H 5/1252 440/57 |
| 5,152,239 | A | * | 10/1992 | Hossfield ............... B63H 25/24 114/144 E |
| 5,392,690 | A | | 2/1995 | Hundertmark |
| 5,640,369 | A | * | 6/1997 | Capell, Sr. .......... G01S 7/52004 367/88 |
| 6,273,771 | B1 | | 8/2001 | Buckley et al. |
| 6,322,404 | B1 | | 11/2001 | Magee et al. |
| 6,402,577 | B1 | | 6/2002 | Treinen et al. |
| 7,104,857 | B1 | | 9/2006 | Swan et al. |
| 7,311,571 | B1 | | 12/2007 | Swan et al. |
| 7,416,456 | B1 | | 8/2008 | Gonring et al. |

(Continued)

OTHER PUBLICATIONS

Unpublished U.S. Appl. No. 15/003,326, filed Jan. 21, 2016.

*Primary Examiner* — Maceeh Anwari
(74) *Attorney, Agent, or Firm* — Andrus Intellectual Property Law, LLP

(57) ABSTRACT

A method of controlling a marine propulsion system includes receiving a roll position measurement signal from a roll sensor measuring roll position of a marine vessel and receiving a steering input. The method includes determining based on the roll position measurement signal and the steering input that the roll position of the marine vessel exceeds a port threshold in a port roll direction where no corresponding steering input is present, and determining based on the roll position measurement signal and the steering input that the roll position of the marine vessel exceeds a starboard threshold in a starboard roll direction where no corresponding steering input is present. A steering compensation is then determined based on the roll position measurement signal, and an actuator is controlled to effectuate the steering compensation to reduce a magnitude of the roll position of the marine vessel.

20 Claims, 7 Drawing Sheets

(56) References Cited

U.S. PATENT DOCUMENTS 7,727,036 B1 6/2010 Poorman et al.
9,290,252 B1 3/2016 Tuchscherer et al.

\* cited by examiner

MARINE PROPULSION SYSTEM AND METHOD OF CONTROLLING THE SAME FOR MITIGATING CHINE WALK

FIELD

The present disclosure relates to methods and systems for controlling propulsion of a marine vessel, and more specifically to methods and systems that control steering of one or more propulsion devices in order to mitigate chine walk.

BACKGROUND

The following U.S. Patents and Applications provide background information and are incorporated herein by reference in entirety.

U.S. Pat. No. 5,392,690 discloses a marine hydraulic system for operation of a power steering assembly that includes a pressure accumulator to provide pressurized hydraulic fluid and valving that permits the transfer of hydraulic fluid within the cylinder to provide efficient use of hydraulic fluid.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 7,727,036 discloses a system and method for controlling movement of a marine vessel. An operator controllable device outputs a signal that is representative of an operator-desired rate of position change of the vessel about or along an axis. A sensor outputs a signal that is representative of a sensed actual rate of position change of the vessel about or along the axis. A rate of position change controller outputs a rate of position change command based upon the difference between the desired rate of position change and the sensed rate of position change. A vessel coordination controller controls movement of the vessel based upon the rate of position change command.

U.S. Pat. No. 9,290,252 discloses systems and methods for controlling trim position of a marine propulsion device on a marine vessel. The system comprises a trim actuator having a first end that is configured to couple to the marine propulsion device and a second end that is configured to couple to the marine vessel. The trim actuator is movable between an extended position wherein the marine propulsion device is trimmed up with respect to the marine vessel and a retracted position wherein the marine propulsion device is trimmed down with respect to the marine vessel. Increasing an amount of voltage to an electromagnet increases the shear strength of a magnetic fluid in the trim actuator thereby restricting movement of the trim actuator into and out of the extended and retracted positions and wherein decreasing the amount of voltage to the electromagnet decreases the shear strength of the magnetic fluid thereby facilitates movement of the trim actuator into and out of the extended and retracted positions. A controller is configured to adapt the amount of voltage to the electromagnet based upon at least one condition of the system.

U.S. application Ser. No. 15/003,326 discloses a method for controlling a trim system on a marine vessel that includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method of controlling a marine propulsion system includes receiving a roll position measurement signal from a roll sensor measuring roll position of a marine vessel and receiving a steering input. The method includes determining based on the roll position measurement signal and the steering input that the roll position of the marine vessel exceeds a port threshold in a port roll direction where no corresponding steering input is present, and determining based on the roll position measurement signal and the steering input that the roll position of the marine vessel exceeds a starboard threshold in a starboard roll direction where no corresponding steering input is present. A steering compensation is then determined based on the roll position measurement signal, and an actuator is controlled to effectuate the steering compensation to reduce a magnitude of the roll position of the marine vessel.

One embodiment of a marine propulsion system includes a propulsion device, a roll position sensor that measures a roll position of a marine vessel, an actuator that effectuates steering of the propulsion device, a position sensor that senses a steering input, and a control module. The control module is configured to determine that the roll position exceeds a port threshold in a port roll direction where no corresponding steering input is sensed, and to determine that the roll position exceeds a starboard threshold in a starboard roll direction where no corresponding steering input is sensed. The control module is further configured to determine a steering compensation based on the roll position, and to control the actuator to effectuate the steering compensation.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Marine vessels that ride on a pad or have performance V-hulls have a tendency to "chine walk", or rock from side to side, due to the torque produced by the propulsion system and the constantly changing wetted surface. Specifically, such marine vessel have a flat portion along the center line of the hull—e.g., the "pad" 8 illustrated in FIGS. 2A-2D. By reducing the wetted surface and riding on this narrow pad, the drag created by the vessel 4 on the water surface 2 is lessened, and thus the marine vessel 4 can go much faster. However, the pad 8 does not provide a very stable riding surface, and chine walk often occurs at particular speeds and conditions. If no intervention is provided, chine walk will continue to increase and can become so severe that it causes the marine vessel to bow hook, which is very dangerous for the driver and any passengers in the marine vessel 4.

Figure 2A:
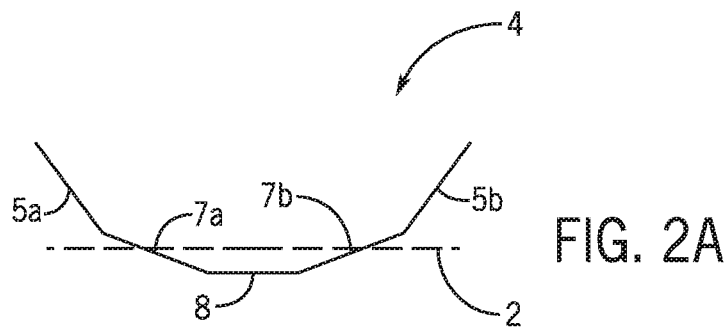
FIG. 2A-2D schematically depict chine walk.
Figure 2B:
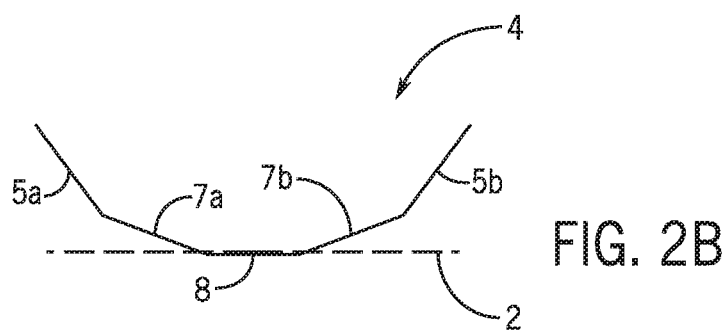
Figure 2C:
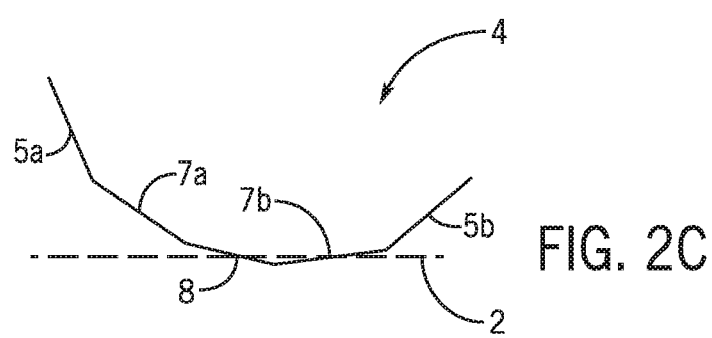
Figure 2D:
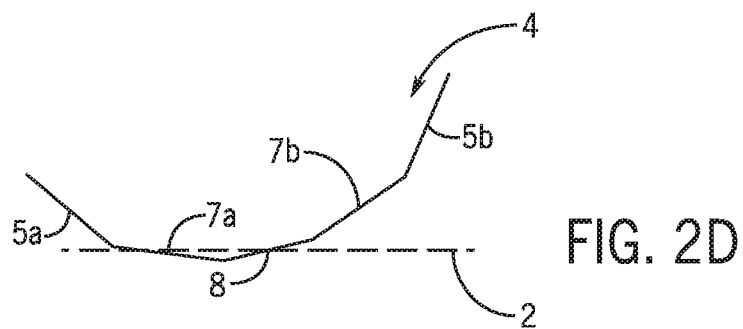

FIGS. 2A-2D schematically depict one example of chine walk. When marine vessels 4 that ride on a pad 8 are on plane, travelling at high speeds and trimmed out, only the pad 8 is in contact with the water surface 2 (illustrated FIG. 2B). Such pads 8 can be narrow and short. Marine vessels 4 riding on a pad 8 tend to rock from chine to chine, as shown in FIGS. 2C and 2D. Specifically, the marine vessel 4 experiencing chine walk will rock over to the starboard chine 7b (as shown in FIG. 2C), then bounce over to the port side chine 7a (as shown in FIG. 2D), and then back to the starboard chine 7b, etc. This "chine walk" tends to start with a small rock from chine to chine 7a, 7b, and tends to progress if the vessel speed is maintained or increased and no intervention is provided to stabilize the marine vessel 4.

Several methods of mitigating chine walk can be employed, including reducing the trim angle of the propulsion device or reducing the vessel speed, which increases the wetted surface of the marine vessel 4. Another option employed by experienced drivers is to counter the chine walk with steering input. When countering with steering input, a driver that detects chine walk will provide a steering input in the opposite direction of the roll created by the chine walk. For example, a driver steers to the port side when the marine vessel 4 rolls to the starboard side 5b. However, providing the proper steering input to mitigate chine walk requires a high level of driver skill and opens up the possibility of user error, and thus the creation of a dangerous situation. Inexperienced drivers do not know how to provide steering compensation to mitigate chine walk, and thus are unable to safely operate high performance marine vessels at top speeds.

The present inventors have recognized that systems and methods are needed to automatically detect chine walk in its very early stages and to take mitigating action to control or eliminate it. Upon recognition of these problems and issues, the inventors developed the disclosed system and method which utilizes a roll sensor to detect when chine walk is beginning to occur and controls a steering actuator to affect a steering compensation based on the sensed roll pattern. The inventors have recognized that providing steering compensation upon early detection of chine walk, where only a slight roll of the marine vessel 4 occurs, can keep chine walk from becoming significant. The inventors have further recognized that such systems can avoid the dangers presented by chine walk, and associated driver error relating to inappropriate attempts to mitigate chine walk.

Figure 1:
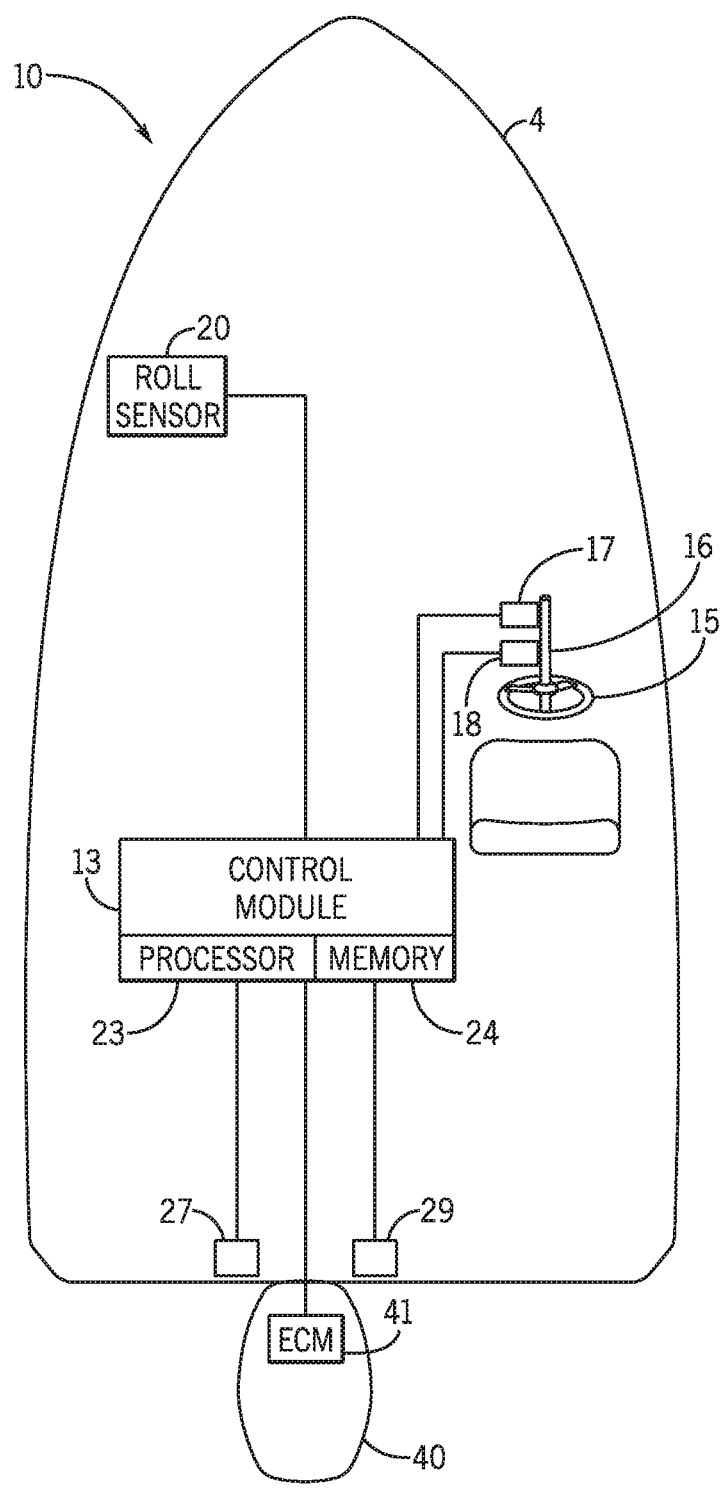
FIG. 1 is a schematic diagram of one embodiment of a marine propulsion system in accordance with the present disclosure.

FIG. 1 depicts an exemplary embodiment of a propulsion system 10 on a marine vessel 4 that detects the occurrence of chine walk and effectuates a steering compensation accordingly. The system includes propulsion device 40 that effectuates a force to propel the marine vessel 4 through the water. Though the depicted embodiment includes a propulsion device 40 that is an outboard drive, a person having ordinary skill in the art will understand in light of this disclosure that the propulsion device 40 regarded herein can be any type of propulsion device for marine applications, such as a stern drive, a pod drive, etc.

The system includes a roll sensor 20 that measures the roll position of the marine vessel 4 and generates a roll position measurement signal, which is provided to control module 13. The control module 13 detects the occurrence of chine walk, determines an appropriate steering compensation to counteract the sensed roll position, and sends control signals to actuate the steering compensation. In various embodiments, the marine propulsion system 10 may be a "steer-by-wire" system, in which there is no direct physical connection between the steering wheel 15 and the propulsion device 40. In other embodiments, direct mechanical or hydraulic connections may link the steering wheel 15 to the steering actuator 29, such as a hydraulic actuator. Both such steering arrangements are well known to those skilled in the art.

The system 10 depicted in FIG. 1 incorporates a "steer-by-wire" steering arrangement. Position sensor 18 is connected to the steering wheel 15 or the steering shaft 16 to detect the rotational position of the steering wheel 15. For example, the position sensor 18 may be a transducer or an encoder connected to the steering shaft 16 and providing a signal representative of the physical position of the rotatable steering shaft 16. The signal from the position sensor 18 is received by the control module 13, which then sends control signals to steering actuator 29 to rotate the propulsion device 40 accordingly.

In the embodiment of FIG. 1, the steering actuator 29 is configured to change the steering position of the propulsion device 40. Thus, the steering actuator 29 rotates the propulsion device 40 about a rotation point. In such systems, the steering actuator 29 may be a hydraulic motor, an electric motor, an electric over hydraulic system. The steering actuator 29 responds to signals received from the control module 13, and accordingly effectuates a desired steering position based on the position of the steering wheel 15 sensed by the position sensor 18. Such control systems and methods are well known in the art, such as that described in U.S. Pat. No. 7,727,036, which is incorporated herein by reference.

The system 10 may further include a steering wheel actuator 17 that effectuates rotation of the steering wheel 15, such as by rotating the steering shaft 16. The steering wheel actuator 17 is communicatively connected to the control module 13 and receives control commands therefrom. The steering wheel actuator 17 imparts a force on the steering shaft 16 to effectuate rotation of the steering shaft 16 and the steering wheel 15, thus effectuating a rotation of the propulsion device 40. The steering actuator 17 may be any type of electric or hydraulic motor capable of imparting a rotational force on the steering shaft 16. To provide just one example, the steering actuator 17 may be a DC motor directly coupled to the steering shaft 16 and capable of back-driving.

In a steer-by-wire arrangement, such a steering actuator may be employed to move the steering wheel 15 for various reasons, such as to move the steering wheel 15 into alignment with the steering position of the propulsion device 40 (e.g., so that the position of the steering wheel 15 corresponds to the position of the propulsion device 40 when the steering is under automatic control by the control module 13). In other embodiments with mechanical or hydraulic steering actuation systems, the steering wheel actuator 17 may be used to provide steering control. Such mechanical systems and methods are well known in the art, such as that exemplified in U.S. Pat. No. 5,392,690, which is incorporated herein by reference. In such arrangements where physical connections are provided between the steering wheel 15 and the steering actuation mechanism—e.g., rotary systems, rack and pin systems, and/or hydraulic systems—the control module 13 can effectuate steering commands by turning the steering wheel 15 by an amount corresponding to the desired steering position of the propulsion device 40.

The control module 13 is equipped with software instructions, such as computer-executable instructions stored in memory 24 and executable on processor 23, to continually receive input from the roll sensor 20, and process the information to detect the occurrence of a roll pattern that indicates chine walk. Upon detection of such a roll pattern, the control module 13 instructs the appropriate actuator, either the propulsion steering actuator 29 or the steering wheel actuator 17 to provide a predetermined steering compensation based on the sensed roll position in order to alleviate the chine walk.

Alternatively or additionally, the control module 13 may effectuate additional controls, such as operating the trim actuator 27 to reduce the trim angle of the propulsion device 40, and/or controlling the propulsion device 40 to reduce the speed of the marine vessel 4. The system 10 may further include a trim actuator 27 that controls the trim angle of the propulsion device with respect to the transom of the marine vessel. Such trim actuation and control systems are known to a person having ordinary skill in the art, such as exemplary systems shown and described at U.S. Pat. Nos. 7,416,456 and 9,290,252, as well as patent application Ser. No. 15/003,326, all of which are incorporated herein by reference.

The roll sensor 20 that senses a roll position of the marine vessel 4, such as an angle with respect to horizontal. For example, the roll sensor 20 may be an internal measurement unit (IMU). The roll sensor 20 may comprise a gyroscope, such as a three-axis gyroscope, to detect orientation information that may be used to determine the roll angle of the marine vessel 4. Alternatively or additionally, the roll sensor 20 may include a magnetometer, or may include any other type of position or inertial measurement unit, such as a combination accelerometer and/or gyroscope with a magnetometer.

Figure 3:
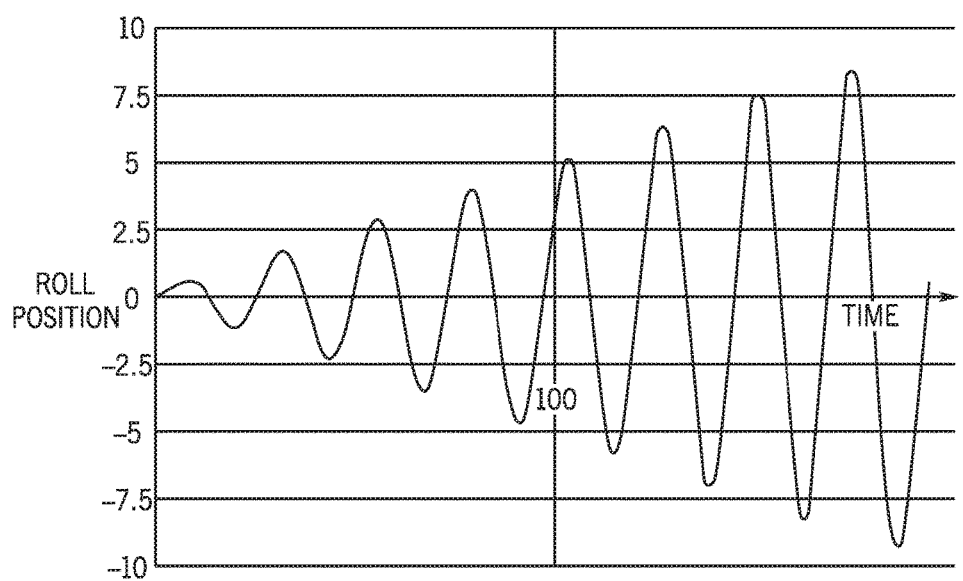
FIG. 3 is a graph depicting an example of roll position over time associated with chine walk.

The control module 13 receives the roll position information from the roll sensor 20 and looks for a roll pattern that would indicate the occurrence of chine walk. Chine walk will generally appear as a periodic or near-sinusoidal oscillation in roll indicating that the marine vessel 4 is rolling back and forth between the port side chine 7a and the starboard side chine 7b, as illustrated in FIGS. 2C and 2D. The graph at FIG. 3 depicts an example of a roll position pattern over time that indicates chine walk. Such oscillations occur automatically due to a confluence of conditions presented to the marine vessel and are not due to any steering input from the user. Thus, when looking for a chine walk pattern, the control module 13 rules out any roll positions that are due to steering input from the user, such as due to a turning. The control module 13 may also be configured to filter out noise from the roll position measurement signal prior to analyzing it to detect chine walk.

FIG. 3 depicts roll position on the Y-axis versus time in seconds on the X-axis. Roll positions to the port side 5a are represented as positive numbers and roll positions toward the starboard side 5b are represented as negative numbers on the graph. As is depicted, the roll position pattern is sinusoidal or approximates a sinusoid, and the amplitude, or magnitude, of the roll increases with time.

Figure 4A:
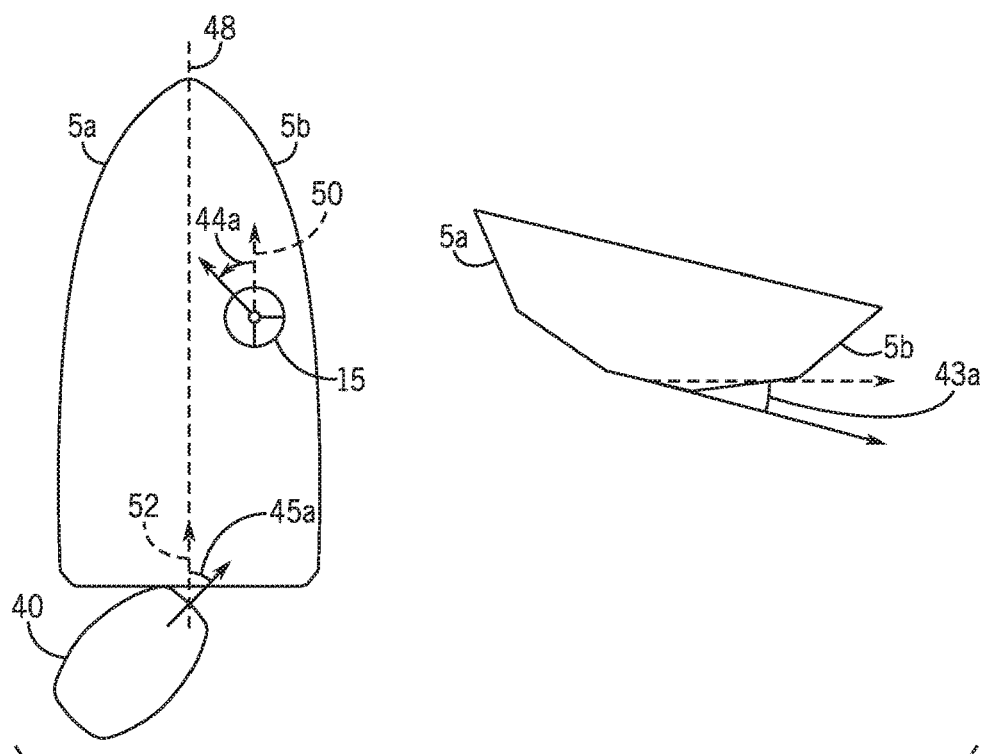
FIGS. 4A and 4B are schematic diagrams depicting a system and method of controlling a marine propulsion system to mitigate chine walk.
Figure 4B:
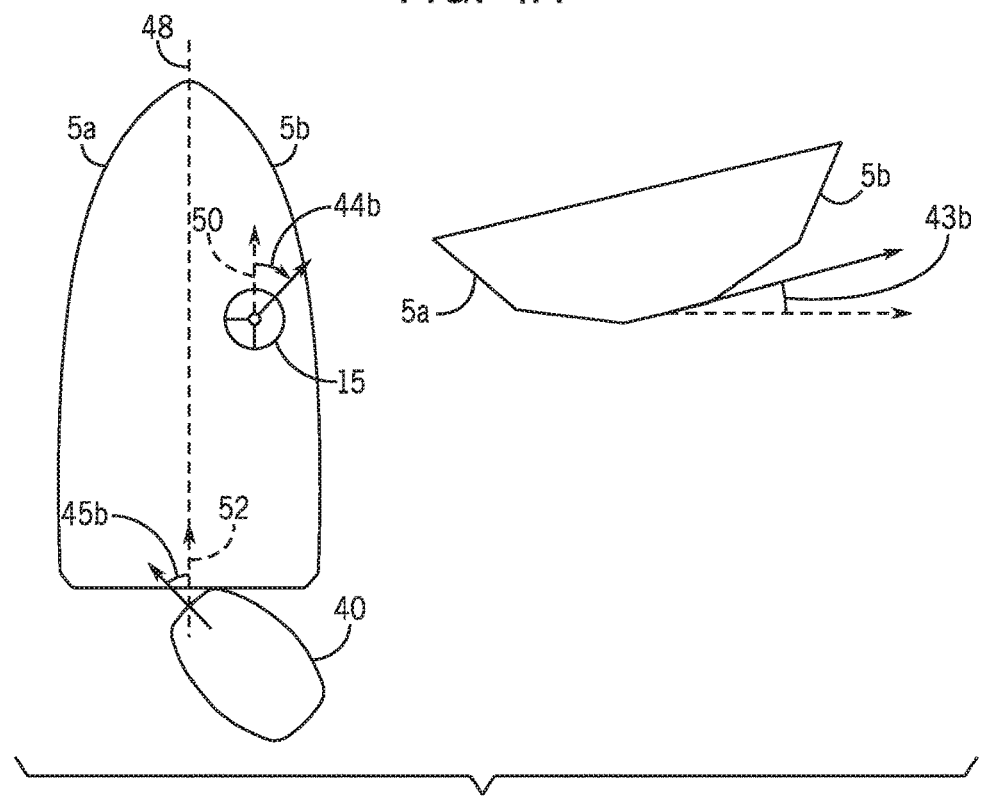

Upon detection of such a pattern the control module effectuates steering compensation action in order to counter the chine walk—i.e. reduce the magnitude of the roll in both directions. FIGS. 4A and 4B exemplify such steering compensation. In FIG. 4A, the marine vessel 4 is in a roll position toward the starboard side 5b, at roll angle 43a away from horizontal. In such an embodiment, a steering correction is made in the port steering direction—i.e., the steering compensation is in the opposite direction of the roll. Thus, the propulsion device 40 is moved to angle 45a with respect to its centered, straight-ahead position 52 (e.g. in line with the centerline 48 of the marine vessel 4), effectuating a thrust towards the port side 5a. As described above, this can be effectuated by controlling the propulsion steering actuator 29 to move the propulsion device 40 to angular position 45a, or it can be effectuated by controlling the steering wheel actuator 17 to move the steering wheel 15 to angular position 44a in the port direction away from the centered position 44a of the steering wheel (the steering wheel position associated with the centered, straight ahead position of the propulsion device 40).

Similarly, when the marine vessel rolls toward the port side 5a—exemplified as angle 43b in FIG. 4B—the propulsion device 40 is positioned at angle 45b, steering the marine vessel 4 toward the starboard side 5b. This can be effectuated by the propulsion steering actuator 29, or by controlling the steering wheel actuator 17 to move the steering wheel 15 to angle 44b toward port, which is the steering wheel angle that corresponds with the desired angle 45b of the propulsion device.

The steering compensation is determined by the control module 13 based on the roll angle. For example, the magnitude of the steering compensation may be proportional to the magnitude of the roll position. Ideally, the roll pattern indicating chine walk is detected early, and the magnitude of the roll never becomes an issue for the driver, and may never become even noticeable to the driver of the marine vessel 4.

Figure 5:
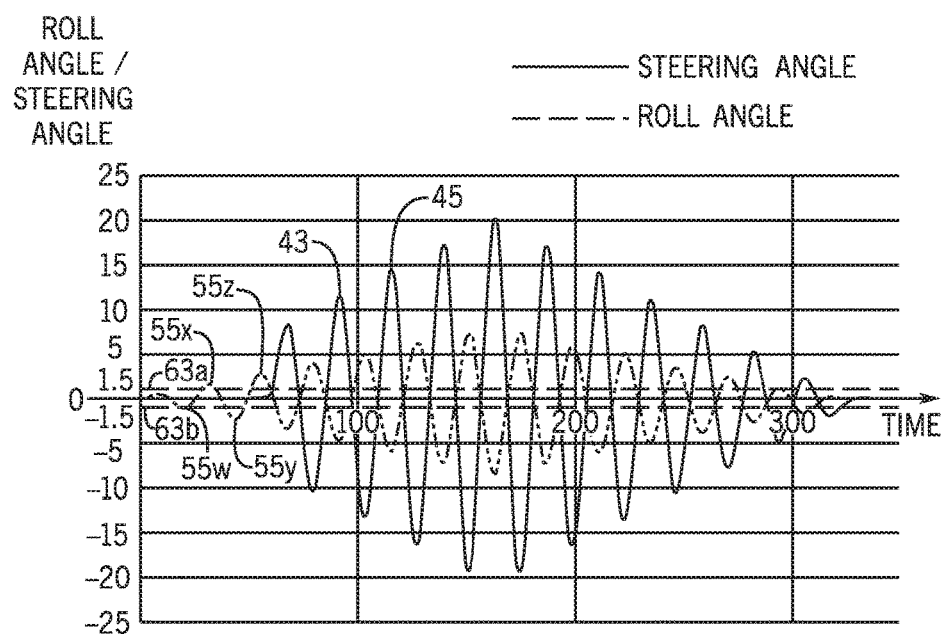
FIG. 5 is a graph depicting a roll position over time associated with chine walk and an exemplary steering compensation that decreases the magnitude of the roll position and mitigates the chine walk.

FIG. 5 depicts one exemplary relationship between the sensed roll angle 43 and the steering compensation 45. As is depicted, the magnitude of the effectuated steering compensation 45 increases as the sensed roll angle 43 increases. The steering compensation 45 may be applied at the same frequency as the change in roll angle. The steering compensation is exemplified in FIG. 5 as the angular steering position 45 of the propulsion device 40 over time. The negative peaks represent turning the propulsion device 40 to effectuate a starboard steering correction (e.g., angle 45a in FIG. 4A), and the positive peaks represent turning the propulsion device 40 to effectuate a port correction (e.g., angle 45b in FIG. 4B). As is shown, the peak magnitude of the steering compensation is timed to correspond with the peak magnitude of the roll position.

As is described above, the steering compensation may also be effectuated according to steering position 44 of the steering wheel 15. In such an embodiment, steering compensation effectuated by rotating the steering wheel 15 may have a greater magnitude than the corresponding steering position 45 of the propulsion device 40 depicted in FIG. 5, depending on the steering ratio of the system.

Figure 6A:
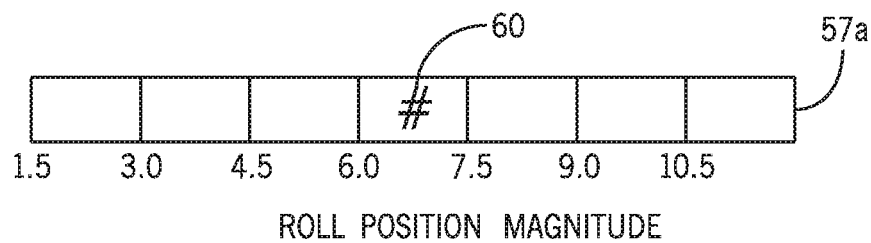
FIGS. 6A and 6B graphically depict exemplary lookup tables for determining steering compensation amounts.
Figure 6B:
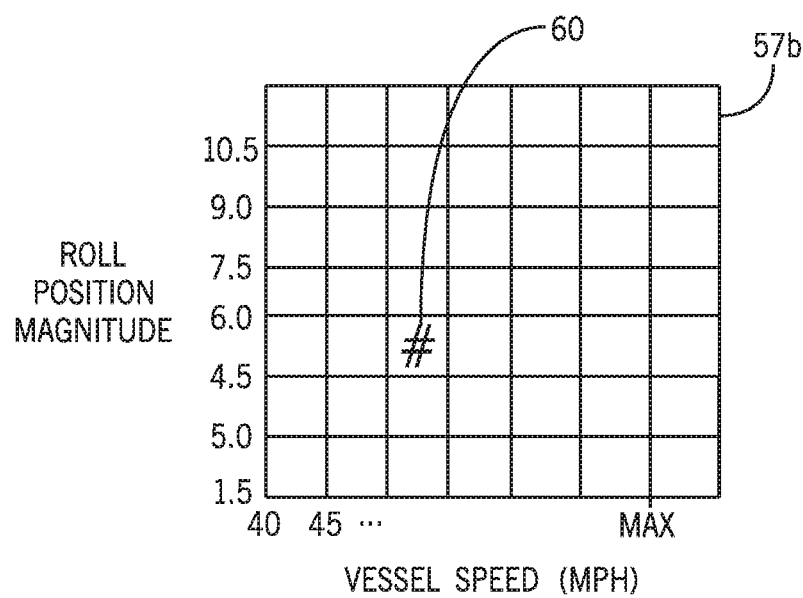

The steering compensation may be determined based on the roll position in any number of ways. For example, a lookup table of steering compensation amounts may be provided based on the currently-sensed roll position. FIGS. 6A and 6B provide exemplary lookup tables of steering compensation amounts 60 based on roll position magnitude. In the example of FIG. 6A, the lookup table 57a provides steering compensation amounts 60 based on roll positions ranging from 1.5° away from horizontal a threshold of to 10.5° away from horizontal. Similarly, a lookup table 57b may be provided containing compensation amounts 60 based on roll position magnitudes and vessel speeds, as exemplified in FIG. 6B. In the depicted embodiment, compensation amounts 60 are provided for the exemplary range of vessel speeds between 40 MPH and a maximum speed of the marine vessel. This speed range is merely exemplary and would be expected to vary depending on the configuration of a particular marine vessel. The vessel speed range provided in the lookup table 57b would generally span the vessel speed ranges at which chine walk could occur.

For both lookup tables 57a and 57b the exemplary roll position magnitude ranges from the threshold magnitude of 1.5° to an upper roll position magnitude above which a maximum steering compensation amount would be applied, which in the depicted example is 10.5°. For example, the maximum roll position value in the lookup table 57a, 57b may be a maximum threshold, such as a maximum threshold magnitude representing the roll position magnitude at which additional intervention is effectuated to reduce the chine walk. Alternatively, the maximum threshold may be a maximum rate of change of the roll position. If the sensed roll position exceeds the maximum threshold, the propulsion device 40 may be gradually trimmed in, or trimmed down, to increase the wetted surface on the hull of the marine vessel 4. In such an embodiment, the control module 13 may instruct the trim actuator 27 to reduce the trim position of the propulsion device 40 by a predetermined amount, or by an amount corresponding to the roll position magnitude. The trim reduction will be minimal and gradual so as not to cause the bow of the marine vessel 4 to suddenly drop and increase the chances of bow hooking. Alternatively or additionally, a roll position magnitude above a maximum threshold may be addressed by reducing a speed of the marine vessel. The adjustment to the speed of the marine vessel will be gradual so as to avoid abruptly dropping the bow of the marine vessel and causing bow hooking.

In the depicted embodiments, the lookup tables 57a, 57b provide compensation amounts 60 based on roll position magnitudes. The compensation amounts 60 are then applied in the opposite direction of the roll position. In other embodiments, the lookup table 57a, 57b may provide compensation amounts based on the roll position, including the directionality values. Thus, referring to the depicted examples, the lookup tables 57a, 57b could contain steering compensation amounts for roll positions ranging from the negative maximum threshold magnitude to the positive maximum threshold magnitude, which in the depicted example is 10.5° away from horizontal. Depending on the configuration of the marine vessel 4, the lookup tables 57a, 57b may provide steering compensation amounts for roll positions symmetrically about the horizontal axis, or asymmetrically. For example, the roll position range toward the starboard side 5b may be different than that for the port side 5a.

In order to detect the occurrence of chine walk, the control module 13 analyzes the roll position measurement signal from the roll sensor 20 to determine whether the roll position of the marine vessel 4 exceeds a port threshold when the marine vessel 4 rolls toward the port side 5a and exceeds a starboard threshold when the marine vessel rolls toward the starboard side 5b. The port threshold and starboard threshold may be, for example, roll angle magnitudes above which the control module 13 assesses for chine walk. To provide just one example in reference to FIGS. 5 and 6A-6B, the port threshold and the starboard threshold are roll angle magnitude values set at 1.5° away from horizontal. The threshold may be a calibratable number based on the configuration of the marine vessel 4, and thus in other embodiments may be greater or less than the exemplary embodiment. In still other embodiments, the port threshold and starboard threshold may be a rate of change of the roll position, such as a rate of change of the roll angle away from horizontal.

The port threshold and starboard threshold may be calibratable values, which may be set sufficiently high to be above the expected noise value for the roll sensor, but low enough so that chine walk can be detected in its early stages. The thresholds in each of the port and starboard directions will vary based on the marine vessel configuration. In various embodiments the port threshold and the starboard threshold may be different values, or they may be the same, depending on the vessel configuration and behavior.

Additionally, in certain embodiments the control module 13 may be configured to determine that the respective port threshold and starboard threshold are exceeded for a predetermined number of roll periods in order to determine that chine walk is present and effectuate the steering compensation accordingly. FIG. 5 depicts one example, where the peaks 55w-55z exceed the respective thresholds 63a and 63b for two roll periods prior to determining that chine walk is occurring and activating the steering compensation represented by line 45—i.e. for two roll cycles including a roll to the starboard side and a roll to the port side. Specifically, the starboard threshold magnitude 63b is exceeded at negative peak points 55w and 55y, and the port threshold magnitude 63a is exceeded at positive peak points 55x and 55z of the roll angle signal 43.

Once chine walk is detected, the compensation amount 60 at any given time may be determined as the value in the lookup table 57a corresponding to the sensed roll position. Alternatively or additionally, the steering compensation amount may be controlled and determined by a proportional integral derivative (PID) controller configured to control the roll position to a desired set point of 0°, or horizontal. In one embodiment, chine walk is detected and an initial steering compensation amount determined by accessing a lookup table providing steering compensation based on roll position and/or vessel speed. The steering compensation may then be controlled based on the output of a PID controller. For example, with an input of roll and vessel speed, the P, I, and D terms may be scaled to yield a corresponding correction to minimize the roll, with the measured roll position as feedback.

Thus, as demonstrated in FIG. 5, the steering compensation decreases as the magnitude of the roll position decreases. And the steering compensation fades out once the magnitude of the roll position is sufficiently reduced to a non-detectable level, such as below the port and starboard thresholds or below an expected noise level.

The propulsion system 10 also includes various control elements, which in the depicted embodiment are exemplified by an engine control module (ECM) 41 on or associated with the propulsion device 40 and control module 13, which in an exemplary embodiment could be a helm control module or a dedicated control module that only performs roll detection. The various aspects of the system 10 are in signal communication with the control module 13, for example via a CAN bus as described in U.S. Pat. No. 6,273,771 which is incorporated by reference herein. The control module 13 includes memory 24 and a programmable processor 23. In other examples of the system 10, the various elements are connected via wireless communication rather than by a serially-wired CAN bus. It should be noted that the lines shown in FIG. 1 are meant only to demonstrate that the various control elements are capable of communicating with one another, and do not represent actual wiring connections between the various elements, nor do they represent the only paths of communication between the elements.

The systems and methods described herein may be implemented by one or more computer programs executed by one or more processors, which may all operate as part of a single control module. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As used herein, the term module may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors may be stored by a single (shared) memory. The term group, as used above, means that some or all code comprising part of a single module may be executed using a group of processors. Likewise, some or all code comprising a single module may be stored using a group of memories.

Accordingly, in other embodiments of the propulsion system 10, the functions of the control module 13 and/or the ECM 41 may be provided with fewer control modules or more control modules than in the depicted embodiment. For instance, another exemplary propulsion system 10 may incorporate multiple control modules 13 that are communicatively connected and cooperate to provide the control functions described herein. In other embodiments, some or all of the control functions described in the exemplary embodiments as performed by the control module 13 may be provided by and incorporated into the ECM 41.

Figure 7:
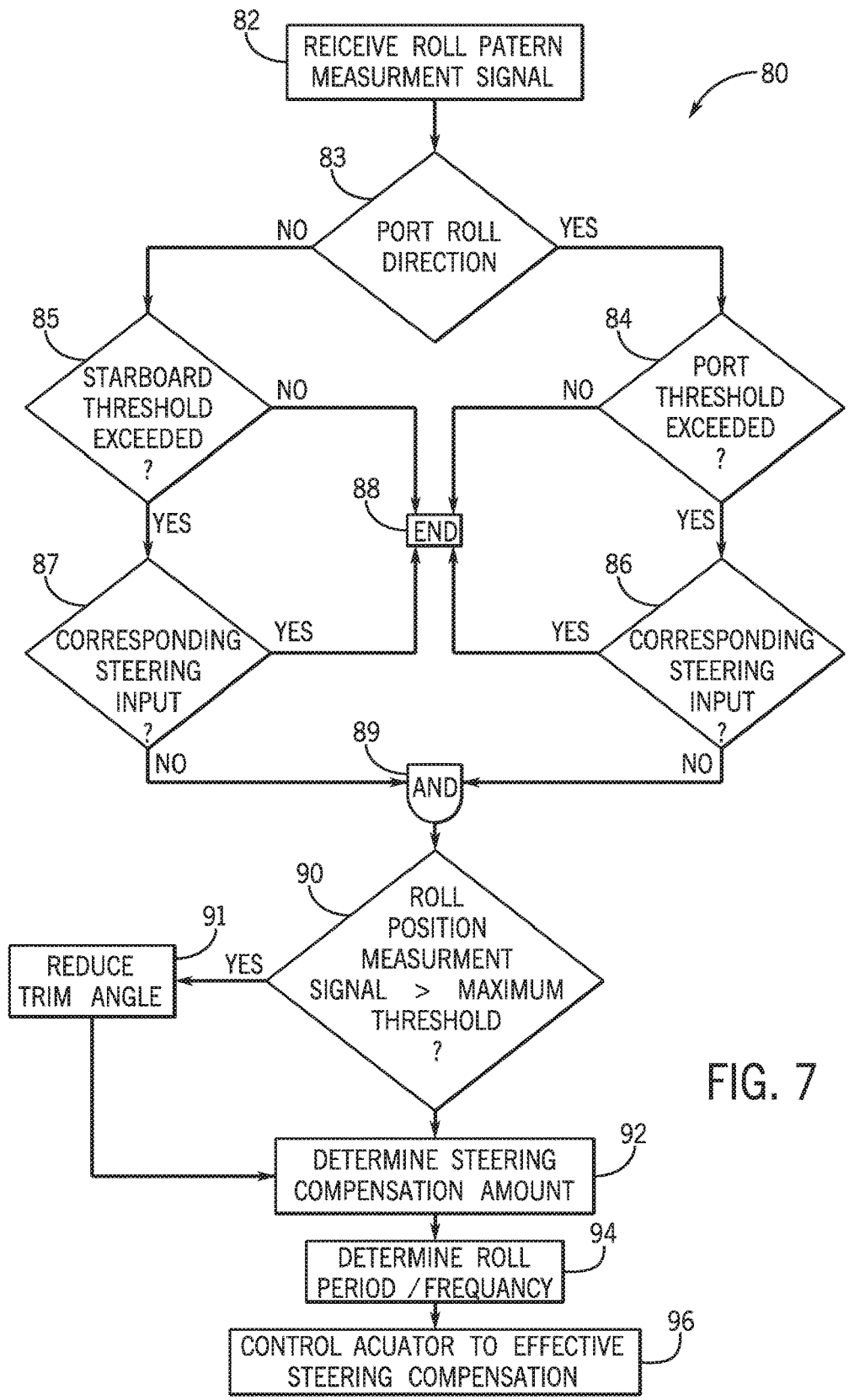
FIG. 7 depicts one embodiment of a method of controlling a marine propulsion system according to the present disclosure.

FIG. 7 depicts one embodiment of a method 80 of controlling a marine propulsion system 10 to mitigate, or reduce, chine walk. A roll position measurement signal is received at step 82, and step 83 is executed to determine whether the marine vessel 4 is rolling toward the port direction or the starboard direction. In certain embodiments, the roll position measurement signal received at step 82 may be a filtered signal where noise has been removed. If the roll position measurement signal indicates that the marine vessel is rolling toward the port side 5a, then step 84 is executed to determine whether the port threshold is exceeded. If so, instructions are executed at step 86 to determine whether a corresponding steering input is being provided by the driver. For example, the controller 13 may determine whether the steering wheel 15 is turned toward the port direction, which would indicate that the cause of the roll is the steering input rather than the chine walk. If a steering input corresponding to the roll toward the port side is detected at step 86, then the detection algorithm is ended at step 88 with no chine walk being detected. Alternatively or additionally, the method steps for detecting chine walk could be suspended when steering input is sensed.

If a corresponding steering input is not detected, then the control module 13 continues to step 89 where it waits for an assessment of whether the starboard threshold is also exceeded. Once the roll position measurement signal indicates a roll toward the starboard direction, step 85 is executed to determine whether a starboard threshold is exceeded. If the starboard threshold is not exceeded in the starboard roll direction, then the inquiry is ended at step 88, and the system continues to monitor future values of the roll position measurement signal to determine whether chine walk is detected. If the starboard threshold magnitude is exceeded at step 85, then step 87 is executed to determine whether a corresponding steering input is present that would have caused the roll in the starboard direction. For example, step 87 may include determining whether the steering wheel 15 is turned toward the starboard direction, indicating that the marine vessel is turning starboard and the roll is due to the turn, not chine walk. If a corresponding steering input is sensed then the inquiry is ended at step 88.

If no corresponding steering input is sensed, and both the port side conditions at step 84 and 86 and the starboard side conditions at steps 85 and 87 have been satisfied, then the requirements of are satisfied at step 89. The roll position measurement signal is compared to a maximum threshold value at step 90 to determine whether the maximum threshold was exceeded in either the port steering direction or the starboard steering direction. If the maximum threshold was exceeded in either direction, then the chine walk is determined to be severe enough to warrant additional intervention. In the depicted embodiment, the trim angle is reduced at step 91, such as by controlling the trim actuator to slightly reduce the trim angle.

Whether or not the maximum threshold is exceeded, step 92 is then executed to determine a steering compensation amount based on the roll position measurement signal. For example, the steering compensation amount may be determined by utilizing a lookup table based on the most recent roll position value in the roll position measurement signal or based on a filtered roll position value. Alternatively, the steering compensation amount may be determined based on the most recent peak magnitude of the roll position measurement signal.

The roll period and/or frequency may be determined at step 94 such that the steering compensation can be applied at the same rate, or frequency, as the roll position measurement signal. In other words, the frequency of the steering compensation in the starboard and/or port steering directions is equal to the frequency of the roll position in the port roll direction and/or the starboard roll direction, respectively. The steering compensation is then effectuated at step 96, such as by controlling one or both of the propulsion steering actuator 29 and the steering actuator 17 as described above. The steering compensation is then applied to counter the roll position of the marine vessel, where a magnitude of the steering compensation is proportional to or based on the magnitude of the roll position and a direction of the steering compensation is opposite that of the roll position.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling a marine propulsion system comprises:
   receiving a roll position measurement signal from a roll sensor measuring roll position of a marine vessel;
   receiving a steering input;
   determining based on the roll position measurement signal and the steering input that the roll position of the marine vessel exceeds a port threshold in a port roll direction where no corresponding steering input is present;
   determining based on the roll position measurement signal and the steering input that that the roll position of the marine vessel exceeds a starboard threshold in a starboard roll direction where no corresponding steering input is present;
   determining that the roll position exceeds both the port threshold and the starboard threshold within a period indicating chine walk;
   determining a steering compensation based on the roll position measurement signal; and
   controlling an actuator to effectuate the steering compensation to reduce a magnitude of the chine walk by alternately moving a propulsion device in both a starboard steering direction and a port steering direction.

2. The method of claim 1, where a magnitude of the steering compensation is proportional to a magnitude of the roll position measurement signal.

3. The method of claim 1, wherein controlling the actuator to effectuate the steering compensation includes moving the propulsion device in a starboard steering direction when the roll position of the marine vessel is in the port roll direction, and moving the propulsion device in a port steering direction when the roll position of the marine vessel is in the starboard roll direction.

4. The method of claim 3, wherein determining the steering compensation includes accessing a steering compensation amount in a lookup table containing steering compensation amounts based on roll positions of the marine vessel.

5. The method of claim 4, wherein the steering compensation amount is an angle of the propulsion device away from a centered position, wherein the actuator is a propulsion steering actuator that effectuates the steering compensation by positioning the propulsion device based the steering compensation amount.

6. The method of claim 1, wherein the port threshold and the starboard threshold are roll angle magnitudes.

7. The method of claim 1, further comprising determining that the roll position of the marine vessel exceeds both the port threshold and the starboard threshold for a predetermined number of roll periods prior to controlling the actuator to effectuate the steering compensation.

8. The method of claim 7, wherein a frequency of the steering compensation in the starboard steering direction and the port steering direction is equal to a frequency of the roll position in the port roll direction and the starboard roll direction.

9. The method of claim 1, further comprising:
   determining that the roll position of the marine vessel exceeds a maximum threshold in at least one of the port roll direction and the starboard roll direction where no corresponding steering input is present; and
   reducing a trim position of the propulsion device.

10. The method of claim 1, wherein the steering input is a steering wheel position sensed by a position sensor associated with a steering wheel on the marine vessel.

11. A marine propulsion system comprises:
    a propulsion device;
    a roll position sensor that measures a roll position of a marine vessel;
    an actuator that effectuates steering of the propulsion device;
    a position sensor that senses a steering input;
    a control module configured to:
       determine that the roll position exceeds a port threshold in a port roll direction where no corresponding steering input is sensed;
       determine that the roll position exceeds a starboard threshold in a starboard roll direction where no corresponding steering input is sensed;
       determine that the roll position exceeds both the port threshold and the starboard threshold within a period indicating chine walk;
       determine a steering compensation based on the roll position; and
       control the actuator to effectuate the steering compensation to reduce a magnitude of the chine walk by alternately moving the propulsion device in both a starboard steering direction and a port steering direction.

12. The marine propulsion system of claim 11, wherein a magnitude of the steering compensation effectuated by the actuator is proportional to the magnitude of the roll position of the marine vessel.

13. The marine propulsion system of claim 11, wherein the actuator effectuates the steering compensation in a starboard steering direction when the roll position of the marine vessel is in the port roll direction, and in a port steering direction when the roll position of the marine vessel is in the starboard roll direction.

14. The marine propulsion system of claim 13, wherein the steering compensation is determined by accessing a steering compensation amount in a lookup table containing steering compensation amounts based on roll positions of the marine vessel.

15. The marine propulsion system of claim 14, wherein the steering compensation amount is an angle of the propulsion device away from a centered position, wherein the actuator is a propulsion steering actuator that effectuates the steering compensation by positioning the propulsion device based on the steering compensation amount.

16. The marine propulsion system of claim 14, wherein the steering compensation amount is an angle of a steering wheel away from a centered position, and wherein the actuator is a steering wheel actuator that effectuates the steering compensation by positioning the steering wheel based on the steering compensation amount.

17. The marine propulsion system of claim 11, wherein the steering input is a steering wheel position sensed by a position sensor associated with a steering wheel.

18. The marine propulsion system of claim 11, wherein the control module is further configured to determine that the roll position of the marine vessel exceeds both the port threshold and the starboard threshold for a predetermined number of roll periods prior to controlling the actuator to effectuate the steering compensation.

19. The marine propulsion system of claim 18, wherein a frequency of the steering compensation in the starboard steering direction and the port steering direction is equal to a frequency of the roll position in the port roll direction and the starboard roll direction.

20. The marine propulsion system of claim 11, wherein the control module is further configured to:
   determine that the roll position of the marine vessel exceeds a maximum threshold in at least one of the port roll direction and the starboard roll direction where no corresponding steering input is sensed; and
   reducing a trim position of the propulsion device.

\* \* \* \* \*